May 23, 1967   L. S. TAYLOR ETAL   3,320,807
FLOAT FOR LIQUID LEVEL GAUGE AND PROCESS OF MAKING SAME
Filed Sept. 28, 1965
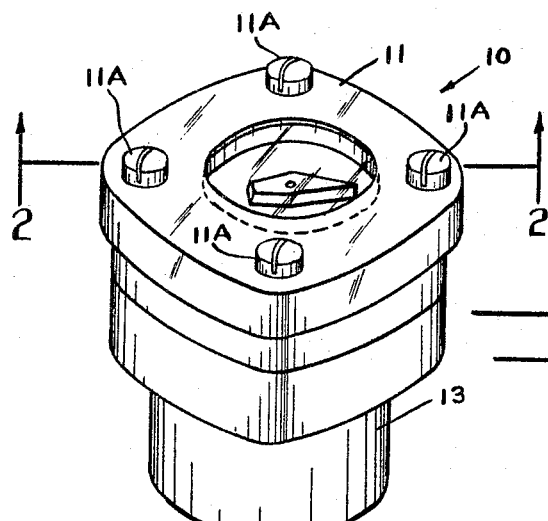
Fig. 1.
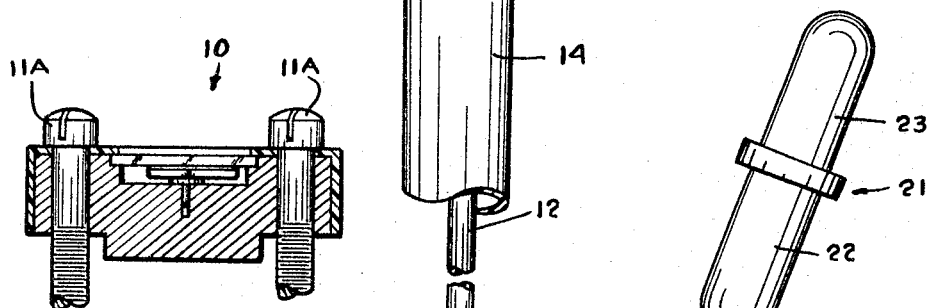
Fig. 2.
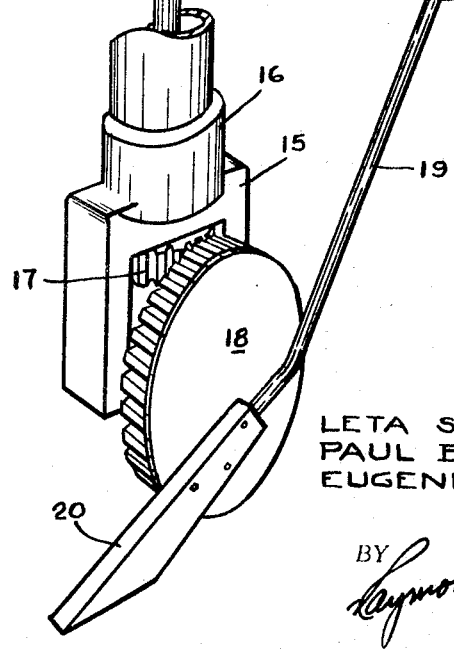
INVENTORS.
LETA S. TAYLOR
PAUL B. JOHNSON
EUGENE D. HUSKEY
BY Raymond A. Paquin
ATTORNEY.

May 23, 1967    L. S. TAYLOR ETAL    3,320,807
FLOAT FOR LIQUID LEVEL GAUGE AND PROCESS OF MAKING SAME
Filed Sept. 28, 1965    2 Sheets-Sheet 2

INVENTORS.
LETA S. TAYLOR
PAUL B. JOHNSON
EUGENE D. HUSKEY

BY
ATTORNEY.

United States Patent Office 3,320,807
Patented May 23, 1967

3,320,807
FLOAT FOR LIQUID LEVEL GAUGE AND
PROCESS OF MAKING SAME
Leta S. Taylor, Paul B. Johnson, and Eugene D. Huskey, Garland, Tex., assignors to J. Y. Taylor Mfg. Company, a corporation of Texas
Filed Sept. 28, 1965, Ser. No. 490,812
5 Claims. (Cl. 73—322.5)

This invention relates to liquid level gauges and has particular reference to a new and improved float for such gauges and process of making same.

An object of the invention is to provide a new and improved float arrangement for liquid level gauges of the type set forth which is simple and economical in construction, yet efficient in operation.

Another object is to provide a new and improved float arrangement of the type set forth which allows its use in a range of fluids without damage to the gauge components.

Another object is to provide a new and improved float for liquid level gauges which may be adapted for use with various storage tanks and/or fluids or liquified gases.

Another object is to provide a new and improved float for a liquid level gauge, which float is adapted to withstand the internal pressures of gases in such tanks, and which float is relatively simple and economical in construction but will also resist chemical reaction from the liquified gases or liquids in the tank, and which enables its uses in a range of liquids.

Another object is to provide a new and improved float for liquid level gauges which is formed of a material which will allow the assembly of components in such manner and by such process as to allow such components to become effectively integral.

Another object is to provide a float for a liquid level gauge wherein the parts normally subject to wear are made of a material which is wear resistant.

Another object is to provide a new and improved process of making a float for a liquid level gauge.

Another object is to provide a new and improved process of assembling the components of a float for a liquid level gauge to obtain an effectively unitary construction.

Another object is to provide a new and improved float for liquid level gauges and process of making same, wherein all of the components may be made of relatively inexpensive material which is capable of manufacture by molding or casting and which may be so united as to form an effectively integral construction.

Other objects and advantages of the invention will be apparent from the following description taken in connection with the accompanying drawings wherein a preferred form of the invention and process are shown and described by way of illustration only.

Referring to the drawings:

FIG. 1 is a perspective view, partially in section, of a liquid level gauge embodying the float of the invention;

FIG. 2 is a sectional view of the gauge head taken on line 2—2 of FIG. 1, looking in the direction of the arrows;

Figure 3:
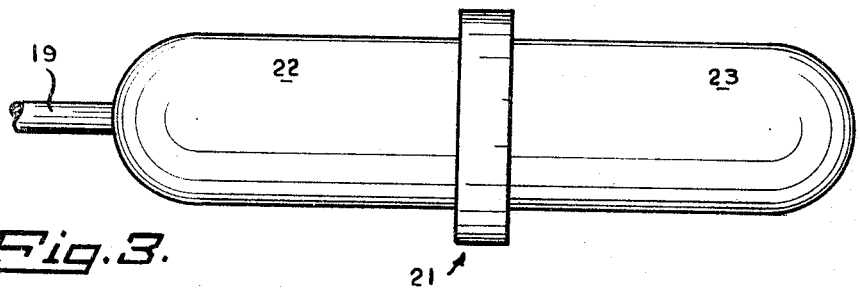
FIG. 3 is a side view of the float and float rod arrangement.
Figure 4:
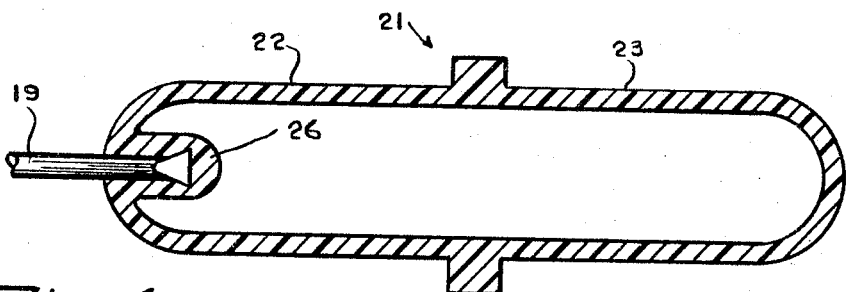
FIG. 4 is a longitudinal sectional view of the float of the invention.
Figure 5:
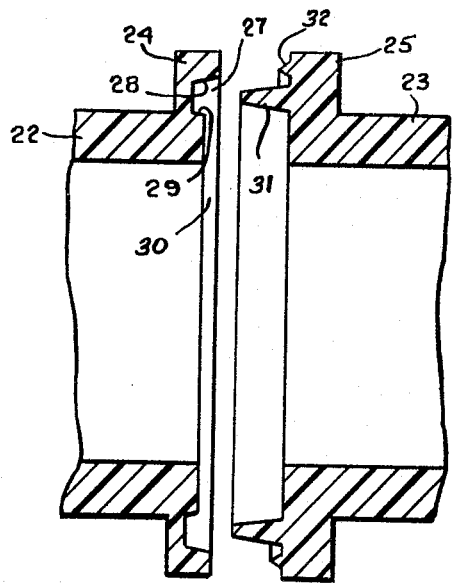
FIG. 5 is a fragmentary sectional view illustrating a step in the process of the invention.

Referring more particularly to the drawings wherein similar reference characters designate corresponding parts throughout the several views, the gauge shown embodying the float of the present invention comprises a gauge head designated generally at 10, having the rim 11 through which are provided openings for bolts or other suitable fastening means 11A for securing the gauge head 10 in operative position over an opening in the storage tank. Gauge head 10 may be cast or molded of suitable plastic material as hereinafter set forth or die cast of aluminum or zinc depending upon the use intended.

Gauge head 10 is provided with a drive magnet (not shown) which is rigidly secured on the upper end of rotatably mounted shaft 12, whereby pivotal movement or rotation of shaft 12 effects simultaneous rotation or pivotal movement of the drive magnet. Shaft or rod 12 may be of chemically resistant plastic as hereinafter specified.

Gauge head 10 is formed with depending tubular portion 13 in telescoping relation with riser 14 which are secured together mechanically or by bonding adhesives.

The cast or molded plastic fork 15 has the tubular portion 16 adapted to receive the end of riser 14 and be secured thereto by staking or bonding by suitable chemical dependent upon the plastic material of which the fork 15 and riser 14 are constructed.

Shaft 12 has its end portion extending through an opening in the wall of fork 15 and on the end of said shaft 12 is positioned driven gear 17 which is formed of metal or of cast or molded plastic and either pinned to the drive shaft 12 in the cast of a metal drive shaft or formed integral therewith in the case of a plastic drive shaft. The driven gear 17 is preferably formed of wear resistant material such as nylon.

The drive gear 18 is pivotally mounted on a pivot in fork 15. This drive gear 18 is preferably formed of wear resistant material such as nylon and meshes with driven gear 17 to thereby pivot drive shaft 12. Float rod 19 is a metal rod and counterweight 20 is secured on float rod 19.

Float 21 is of suitable chemical resistant plastic such as nylon and is secured to metal float rod 19 in any suitable manner.

Float 21 is formed or molded of cast plastic in two members 22 and 23 and these members are provided with the adjacent flanges 24 and 25, respectively, which are united by spin welding or ultra-sonic welding to form an effectively integral float which does not leak.

In the manufacture of the float section 22 by molding, the section has an opening molded therein which extends into integral projectio nor reinforced portion 26 which is provided adjacent the end of float section 22.

This opening or slot in projection 26 is preferably of smaller cross section than float rod 19 and the end of float rod 19 is flatened which causes it to become wedge shaped as shown.

In the assembly of the float to the float rod 19, either the rod 19 or the float is heated and the rod 19 then has its end positioned in the opening in projection 26.

Upon cooling the end of float section 22 shrinks around the end of rod 19 forming an effectively united connection therebetween.

By controlling the size and weight of the float portions the float can be adapted to the particular gauge on which it is to be employed.

The float portions 22 and 23 are cast or molded of chemically resistant plastic such as nylon or other suitable material as hereinafter specified.

In the manufacture of the liquid level gauge of this invention, the gauge head 10 may be formed of die cast metal such as aluminum or zinc or molded or cast of a plastic having sufficient strength such as nylon or an acrylonitrile-butadiene-styrene composition which is relatively stable, tough, hard and rigid and withstands acids and pressure and resists weather.

Other plastics which might be employed depending upon the material with which the gauge is to be used are polycarbonates, polystyrenes, acrylics, vinyls or others with suitable properties.

Other parts, such as the indicator head, connector riser, fork, drive rod, and drive gears may also be formed of such plastic materials.

One of the flanges 24 or 25 is formed with an annular groove 27, preferably at least partially outside the plane of the periphery of the outer surface of the float section, which groove preferably has inwardly tapering side walls 28 and 29 and with its bottom narrower than its outer end and an annular cutback 30 from the inside edge 29 of groove 27 to the inside of the float section which relief allows excess material from the tongue on the other section to flash inside of the float during the jointing operation.

The other flange opposite groove 27 has a large annular projection or tongue 31 and a smaller tongue 32. The large tongue 31 is narrower than the width of groove 27 but this tongue 31 is longer than the depth of said groove 27. This tongue 31 is trapezoidal in shape and is adapted to be centrally located relative to groove 27.

The small annular projection or tongue 32 is V shaped to provide a welded seal at the extreme outside edge of the flange to prevent excess material from trapezoidal shaped tongue 31 to flow outside of the float. This tongue 32 may be formed on either flange.

Both tongues 31 and 32 are located on the flange directly under the welding horn to obtain maximum energy from the ultrasonic welder or spinweld.

While the float sections are preferably joined by ultrasonic welding, this could be accomplished by spinwelding.

With the construction shown, the end of trapezoidal tongue 31 contacts the bottom of groove 27 before the smaller tongue 32 contacts the surface of the opposing flange and upon contact, material from tongue 31 begins flowing in both sides of groove 27. As the float sections are drawn closer together, tongue material from trapezoidal tongue 31 flows up the sidewalls of groove 27. The V projection 32 has then made contact and prevents material from flowing to outside. The float sections are fused together and sealed, pressure tight.

From the foregoing it will be seen that I have provided new and improved means and process for obtaining all of the objects and advantages of the invention.

We claim:

1. The process of making a float for a liquid level gauge comprising, forming a pair of open end float sections with each section having an external peripheral flange adjacent its free end, forming an annular groove in the end surface of the flange on one of said float sections, forming a first annular projection on the end surface of the flange of the other of said float sections longer than the depth of said annular groove, forming a second, smaller annular projection outside of said first projection, and securing said sections in effectively unitary relation with said first annular projection in said annular groove by welding to form a unitary construction.

2. The process of making a float for a liquid level gauge comprising, forming a pair of open end float sections with each section having an external peripheral flange adjacent its free end, forming an annular groove in the end surface of the flange on one of said float sections, forming a first annular projection on the end surface of the flange of the other of said float sections longer than the depth of said annular groove, forming a second, smaller annular projection outside of said first projection, and securing said sections in effectively unitary relation with said first annular projection in said annular groove by ultra-sonic welding of said sections with said first projection in said groove.

3. The process of making a float for a liquid level gauge comprising, forming a pair of open end float sections of non-metallic material with each section having an external peripheral flange adjacent its free end, forming an annular groove in the end surface of the flange on one of said float sections, forming a first annular projection on the end surface of the flange of the other of said float sections longer than the depth of said annular groove but smaller in cross section than said annular groove, and a second, smaller annular projection on one of said grooves outwardly of said annular groove, and securing said sections in effectively unitary relation with said first annular projection in said annular groove by ultra-sonic welding of said sections with said projection in said groove.

4. A float for a liquid level gauge made by forming a pair of open end float sections of plastic moldable material with each section having an external peripheral flange adjacent its free end, forming an annular groove in the end surface of the flange on one of said float sections, forming a first annular projection on the end surface of the flange of the other of said float sections longer than the depth of said annular groove, and a second, smaller annular projection outside of said first projection, and securing said sections in effectively unitary relation with said first annular projection in said annular groove by welding of said sections with said projection in said groove.

5. A float for a liquid level gauge made by forming a pair of open end float sections of plastic moldable material with each section having an external peripheral flange adjacent its free end, forming an annular groove in the end surface of the flange on one of said float sections, forming a first annular projection on the end surface of the flange of the other of said float sections longer than the depth of said annular groove, and a second, smaller annular projection outside of said first projection, and securing said sections in effectively unitary relation with said annular projection in said annular groove by ultra-sonic welding of said sections with said first annular projection in said groove.

References Cited by the Examiner

UNITED STATES PATENTS

| | | | |
|---|---|---|---|
| 585,449 | 6/1897 | Rockwell | 73—322.5 |
| 1,714,733 | 5/1929 | Shank | 73—322.5 X |
| 2,792,164 | 5/1957 | Cauffiel | 73—322.5 X |
| 3,120,570 | 2/1964 | Kennedy et al. | 264—45 |
| 3,224,916 | 12/1965 | Soloff et al. | 156—73 |

FOREIGN PATENTS 144,522  2/1952  Australia.

LOUIS R. PRINCE, *Primary Examiner.*

D. M. YASICH, *Assistant Examiner.*